United States Patent [19]

Wartes

[11] 4,237,870

[45] Dec. 9, 1980

[54] SOLAR COLLECTOR FOR GASEOUS HEAT EXCHANGE MEDIA

[75] Inventor: Lloyd L. Wartes, Denver, Colo.

[73] Assignee: Ecothermia, Inc., Denver, Colo.

[21] Appl. No.: 960,265

[22] Filed: Nov. 13, 1978

[51] Int. Cl.³ .............................................. F24J 3/02
[52] U.S. Cl. .................................. 126/450; 126/448; 126/449; 165/171
[58] Field of Search ............................. 126/442–450, 126/435, 432, 417; 165/171–175

[56] References Cited

U.S. PATENT DOCUMENTS

| 658,195 | 9/1900 | Tudor | 126/436 |
|---|---|---|---|
| 4,073,282 | 2/1978 | Schriefer, Jr. | 126/432 |
| 4,130,108 | 12/1978 | Patil | 126/449 |
| 4,150,661 | 4/1979 | Gallegar | 126/450 |

FOREIGN PATENT DOCUMENTS 2310539  7/1977  France ...................................... 126/444

Primary Examiner—James C. Yeung
Attorney, Agent, or Firm—Beveridge, DeGrandi, Kline and Lunsford

[57] ABSTRACT

A black plate absorber divides the chamber of a solar collector into upper and lower spaces, both of which are provided with inlets and outlets for a heat exchange medium. Heat losses through the side walls are reduced by providing, between the chamber and the side walls, side conduits which have inlets and outlets for a heat exchange medium.

13 Claims, 4 Drawing Figures

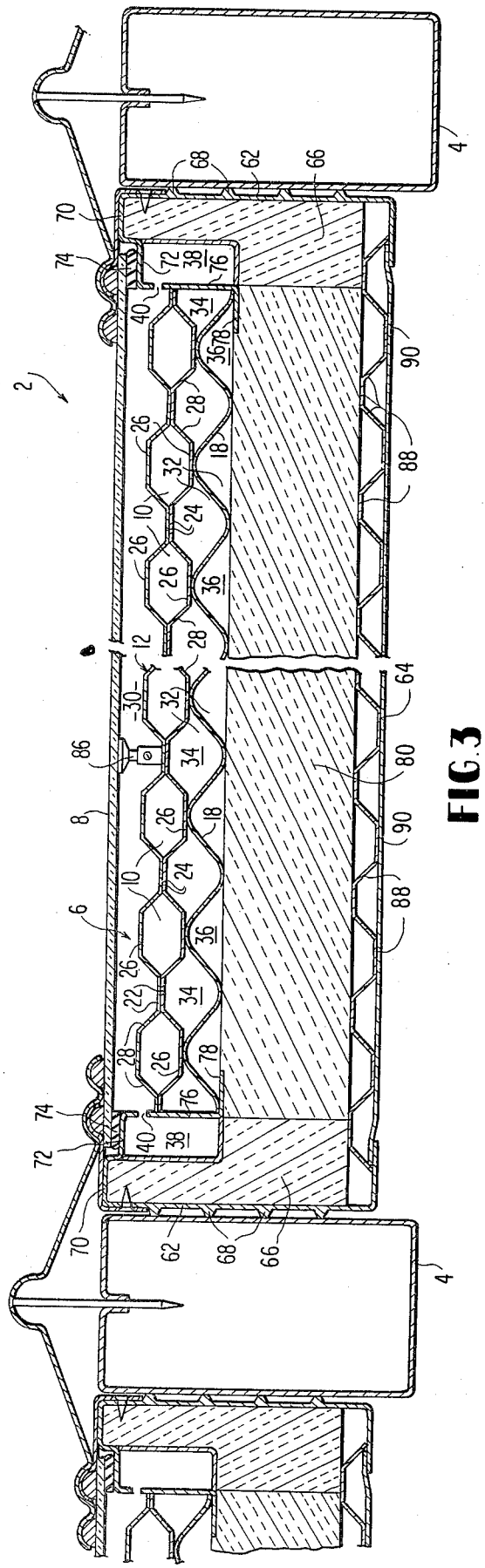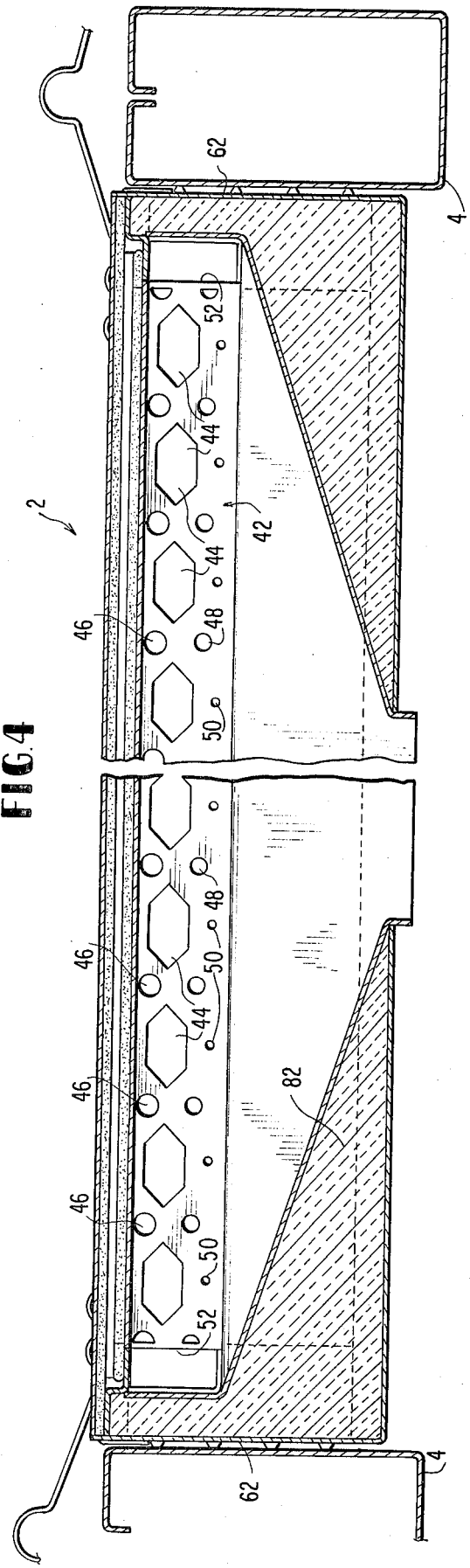
FIG.3
FIG.4

SOLAR COLLECTOR FOR GASEOUS HEAT EXCHANGE MEDIA

BACKGROUND AND SUMMARY

This invention relates to solar collectors which utilize air or other gaseous heat exchange media.

The basic principle of solar collectors is quite old, such collectors usually including a box-like enclosure with a transparent cover which forms a chamber. An absorber panel with conduits for water, air or other heat exchange media is located in the chamber, spaced from the cover. The interior of the chamber and the conduits are provided with a black coating to increase their absorptivity to solar radiation. Radiant energy is absorbed to heat the interior of the chamber, and the heat is removed by a heat exchange medium circulated through the conduits.

There has been extensive activity in recent years in attempting to improve the efficiency of solar collectors. This invention represents yet another approach to such efficiency improvement.

Prior solar collectors have often had an absorber panel located in the chamber, spaced from both the cover and the bottom of the chamber. Gaseous heat exchange media have been flowed either through the upper or lower space. According to one aspect of the present invention, the spaces both above and below the absorber conduits are provided with inlets and outlets which enable a heat exchange medium to flow therethrough. The heat exchange medium flowing through the upper space removes heat from the chamber and reduces heat losses through the cover, while the heat exchange medium flowing through the lower space removes heat from the chamber and reduces heat transmission to the bottom of the enclosure. Preferably, the primary conduits are provided by a pair of adjacent sheets having mutually contacting longitudinally extending areas and mutually spaced longitudinally extending areas. This structure is supported on a corrugated member located in the lower space and provided with peaks which underlie and support the primary conduits. An apertured baffle distributes the incoming heat exchange medium to the various conduits and spaces, the baffle providing inlets to the upper and lower spaces which is less than the total area of the inlets leading to the primary conduits.

According to another aspect of the invention, heat losses through the side walls of a collector enclosure are reduced by providing a side conduit which extends along the side of the collector chamber. The side conduit is provided with inlet and outlet means for enabling a heat exchange medium to flow therethrough to reduce heat losses through the walls. Preferably, the outlet means for the side conduit leads to the space in the collector chamber which lies between the cover and the absorber conduits.

For a further understanding of the invention, reference is made to the following description and drawings of a preferred and exemplary embodiment.

THE DRAWINGS

FIG. 3 is a transverse sectional view through the collector showing the various heat exchange passages, this view being taken along the line 3—3 in FIG. 1.

FIG. 4 is a transverse sectional view of the apparatus, showing the air distribution inlets for the various spaces and conduits of the apparatus.

DESCRIPTION OF A PREFERRED EMBODIMENT

Figure 1:
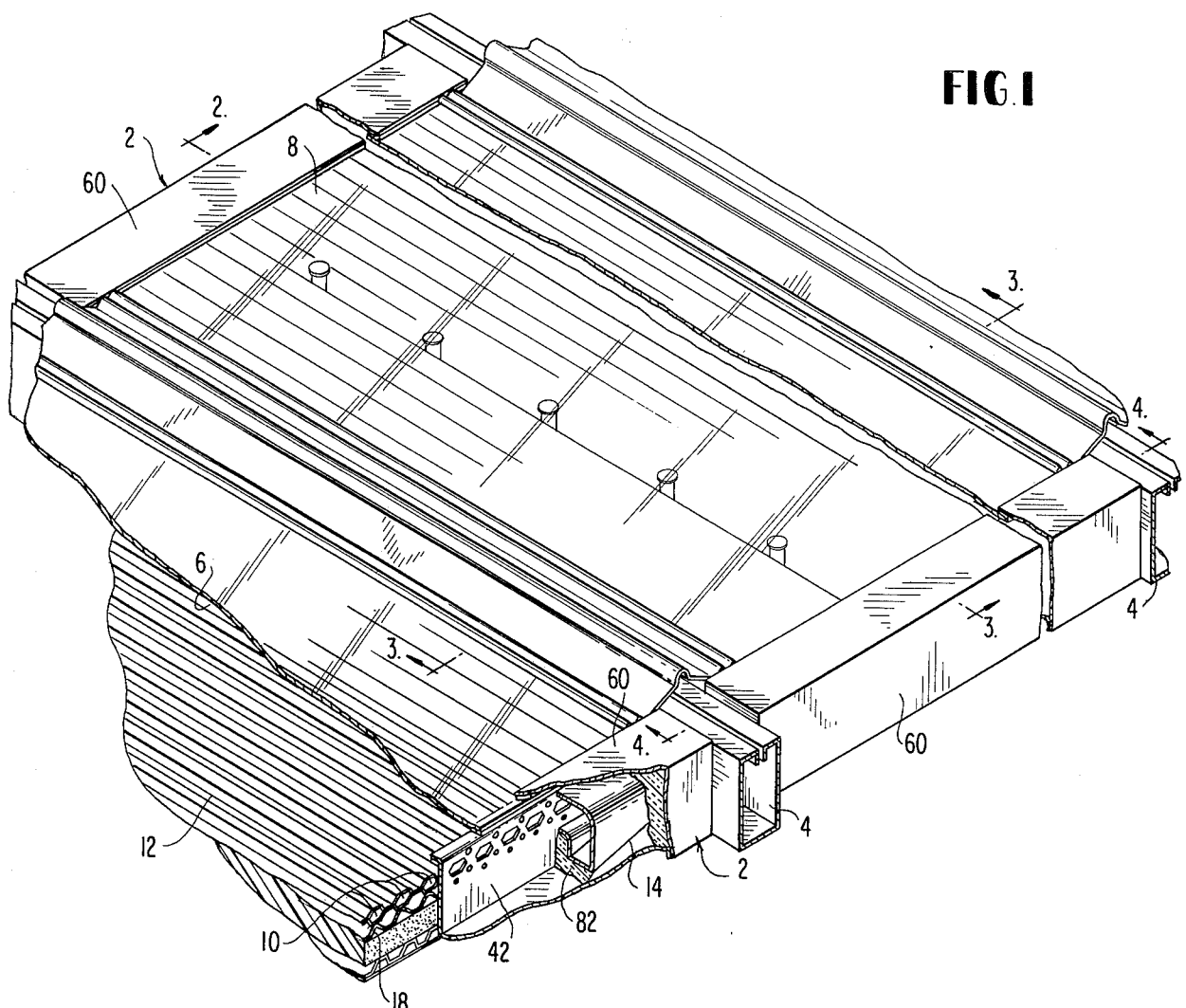
FIG. 1 is a broken perspective view of collectors constructed according to the invention, installed in a building structure.

FIG. 1 shows a pair of the inventive solar collectors 2 supported between parallel roof beams on joists 4. Each collector includes an enclosure or housing which has an internal chamber 6 formed by thermally insulated walls and a cover 8 formed of low iron glass which is transparent to radiant solar energy. The wall structure includes transverse and longitudinal side walls, and a bottom wall. The chamber 6 is heated by solar energy, and most of the heat collected is carried away to a point of use by a stream of air which flows through primary air passages 10 in an absorber panel 12.

Figure 2:
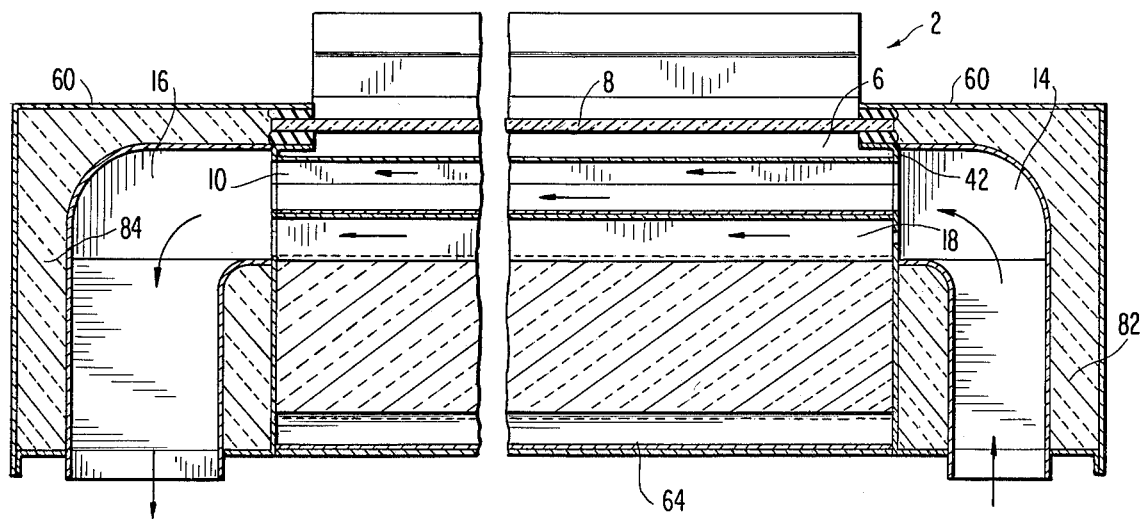
FIG. 2 is a sectional view of a collector along the line 2—2 in FIG. 1.

As shown in FIG. 2, the collector has an air inlet plenum chamber 14 at its inlet end and an air outlet plenum chamber 16 at its outlet end. Within the chamber 6, the blackplate absorber panel 12 is supported on a longitudinally corrugated aluminum sheet 18 shown best in FIG. 3. The primary conduits 10 in absorber panel 12 are each provided with an inlet at plenum 14 and an outlet at plenum 16 enabling a heat exchange medium to move therethrough to remove absorbed heat from the chamber 6. The conduits 10 are preferably of hexagonal configuration as shown in FIG. 3, formed between a pair of back-to-back ribbed or bold beam aluminum panels 22 which have a black absorptive coating on the top side and a bright reflective surface on the bottom side. The panels 22 have mutually contacting longitudinally extending flat areas 24 mutually spaced longitudinally extending flat areas 26, and inclined areas 28 which lie between and connect the areas 24 and 26.

The absorber panel 12 is continuous and extends the full length and width of the chamber 6 to provide an upper space 30 and a lower space 32 in the chamber. Each of these spaces has an air inlet at plenum 14 and an air outlet at plenum 16. The corrugated sheet 18 has a uniform cross section throughout its length, each of the peaks thereof underlying and supporting one of the primary conduits 10 of the absorber panel 12. This corrugated sheet 18 spaces the panel 12 from the bottom of the enclosure and divides the lower space 32 into two distinct sets of channels 34 and 36, each of which has an inlet and an outlet for the flow of a heat exchange medium. The arcuate exterior surface of corrugated sheet 18 provide narrow lines of contact with the flat areas 26 and the insulation 80 described below, thereby reducing the areas of potential heat loss by thermal conductivity.

As shown in FIG. 3, each of the longitudinal side walls of the collector is provided with a side conduit 38 through which air is circulated to reduce heat losses through the collector walls. Each of these side conduits has an air inlet at plenum 14 and air outlets in the form of a longitudinal slot or slots 40 exposed to and in communication with the upper space 30 above the absorber panel 12 in chamber 6. Small outlet openings (not shown) also lead directly from conduits 38 into the plenum 16, to prevent the formation of pockets of stagnating air in conduits 38.

As previously mentioned, the various conduits and spaces 10, 30, 32 and 38 have inlets at the plenum 14. Air from plenum 14 is distributed to these conduits and spaces in proportions which will optimize unit efficiency. Preferably, such distribution is performed by an apertured baffle 42 shown in FIGS. 1 and 4, provided with a first set of openings 44 which are in register with and geometrically identical to the primary conduits 10. A second set of openings 46 leads to the upper space 30; a third set of openings 48 leads to the upper channels 34 of space 32; a fourth set of openings 50 leads to the lower channels 36 of space 32; and, a further set of openings 52 conforming in size, shape and location to side conduits 38 leads from plenum 14 to the side conduits 38. Preferably, the total area of all the inlet openings 46, 48 and 50 is about one-half the total area of the inlet openings 44. The inlet openings 46 are larger than inlet openings 48 which, in turn, are larger than inlet openings 50. The total area of openings 46 is about twice the total area of all the openings 48 and 50. The velocity of air moving through spaces 30 and 32 is approximately equal. About four times the quantity of air passes through the passages 10 as through the upper and lower spaces 30 and 32 combined.

As shown in FIGS. 2–4, the enclosure is formed of bodies of thermal insulation housed in a metal shell. The shell includes end pieces 60 shown in FIG. 2, side pieces 62 shown in FIGS. 3 and 4 and a bottom structure 64 shown in FIGS. 2–4.

As seen in FIG. 3, each of the side pieces 62 house a piece of 66 thermal insulation and has an outer wall provided with spaced points or ridges 68 which minimize the surface contacting the beams 4 to reduce conductive heat losses. The side insulation pieces 66 are conventional glass fiber insulation about one to two inches thick. Upper horizontal flanges 70 and 72 on the side pieces overlie the insulation side piece 66, flange 72 also providing a support shoulder for the transparent cover 8 which rests on a sealant strip 74. Inner flanges 76 of side pieces 62 line the sidewalls of the chamber 6, while lower horizontal flanges 78 thereof assist in retaining a bottom insulation piece 80 in position.

The shell end pieces 12 enclose insulation pieces 82 and 84 in which the plenums 14 and 16 are found. The insulation piece 82 is provided with the inlet plenum cavity 14 which is lined with foil or coated with an impervious layer of aluminum or other materials. The piece 84 at the high temperature outlet end of the collector is formed of a cellular glass insulation and has the outlet plenum cavity 16. The outlet plenum 16, like the inlet plenum 14, is coated or lined. The heating of the air moving through the collector 2 will expand so that the volumetric flow rate arriving at the outlet plenum 16 will be greater than that introduced at the inlet plenum 14. To accommodate this expansion, it will be observed in FIG. 2 that the outlet plenum has a cross section about twice that of the inlet plenum. The external inlets and outlets to the plenums 14 and 16 may extend downwardly as shown, or longitudinally in order to connect with an end-mounted duct, or in any other appropriate direction.

The cover 8 is supported on the flanges 72 and sealed thereto by gaskets 74. The width of the unit makes it desirable to provide supplemental supports for the cover 8 such as those illustrated at 86 in FIGS. 1 and 4. These stationary supports may be provided at their upper ends with suction cups which engage the cover 8 to prevent displacement of the cover when subjected to wind pressure or vacuum.

The bottom of the shell includes the bottom insulation piece 80 of the rigid polyurethane foam at least about one inch thick, or other suitable insulation, provided on its upper and lower surfaces with layers of aluminum foil. The selection of appropriate thickness and compositions of this insulation will depend upon the temperatures at which the unit is designated to operate. Beneath this insulation is a spacer element 88 and a flat exterior member 90 supported by flanges 78. The spacer 88 is corrugated to provide longitudinal rigidity to the collector and dead air spaces which minimize the transmission of heat from the bottom insulation piece 80 to the exterior member 90.

The heat exchange medium, preferably air, enters the inlet plenum 14 of the collector unit and moves through the respective passages 10, 30, 32 and 38 to the outlet plenum 16. (Referring to FIG. 2.) When the air flow is properly distributed, the velocity and rate of flow through the primary passages 10 is greater than that through the upper space 30 and greater than that through the lower space 32. Although it is possible to use a circulating fan in connection with the invention, experience has shown that the natural convective currents produced by heating of the air will provide the necessary circulation, requiring substantially less energy and being less vulnerable to mechanical failures than those systems which require a circulating fan.

The collector units may be externally mounted on conventional roof structures, but is is preferred that they be installed between joists or rafters to form the roof structure itself. The joists or rafters may be rolled metal or timber, selected for the particular strength and architectural effect desired. As shown, the rolled metal joists are covered by a cap which is sealed to the cover by means of a silicone or other high temperature-resistant gasket. The width of the collector is selected to conform to the between-joist distance of the building design, an appropriate standard width being approximately four feet. The length of such units may be standardized or special lengths, suitable lengths being nine feet, seventeen feet, twenty-five feet, thirty-three feet or more. A variety of means may be used to connect the individual collectors to the joists 4 to provide the appropriate degree of support.

As shown in FIGS. 2–4, the enclosure is formed of bodies of thermal insulation housed in a metal shell.

The cover 8 may take many forms compatible with the invention. There may be two parallel sheets of such glass separated by an air space, one sheet or two spaced parallel sheets of water-clear plastic having good transmittance of solar radiation, or a sheet of plastic separated by an air space from a sheet of glass. Another suitable cover, sold by Rohm and Haas under the trademark TWIN-WALL, is a clear transmissive polycarbonate sheet with two parallel flat panels connected by many parallel webs. If the collector is to be operated at high temperatures, the cover may be two spaced sheets of glass or plastic overlying and spaced from a third parallel sheet of glass which is positioned only in the high temperature section of the collector where normal operating temperatures are about 250° F. and higher. The performance of any of these potential covers may be enhanced by configuring the upper surfaces of the sheets to resemble in cross section the teeth of a miniature crosscut saw or file, thereby reducing reflective losses of solar energy.

Persons familiar with solar collector design will recognize that the invention may assume many forms other than those described and illustrated herein. For example, the walls of conduits 10 may take a variety of shapes including rectangular, sinuous or sawtooth. These and the hexagonal shape all provide surfaces which are inclined from the horizontal in transverse cross section. Such surfaces will be in the path of solar rays which are incident from a side angle. Therefore, it is emphasized that the invention is not limited to the disclosed embodiments, but includes a diversity of modifications and improvements which fall within the spirit of the following claims.

I claim:

1. A solar collector for heating air or other gaseous heat exchange media, comprising, an enclosure having a chamber formed by walls and a cover which is transparent to radiant solar energy, primary conduit means located within the enclosure for providing a primary flow passage for a heat exchange medium, said primary conduit means having an upper surface which is absorptive of solar radiation, said primary conduit being spaced from the cover to provide a first space between the primary conduit means and the cover, said primary conduit means being spaced from the bottom of the chamber to provide a second space between the primary conduit means and the bottom of the chamber, said primary conduit means having inlet and outlet means enabling a heat exchange medium to flow therethrough to remove heat from the chamber, said first space having inlet and outlet means enabling heat exchange medium to flow therethrough to remove heat from the chamber and reduce heat losses through said cover, said second space means having inlet and outlet means enabling a heat exchange medium to flow therethrough to remove heat from the chamber and reduce heat transmission to the bottom of the enclosure, a common inlet chamber which contains a gaseous heat exchange medium and is in communication with all of said inlet means, said inlet means of said primary conduit means being substantially larger than the inlet means of said first and second spaces to provide a substantially greater quantitative flow of the gaseous heat exchange medium through said primary conduit means than through said spaces.

2. The solar collector of claim 1 wherein the second space includes a plurality of upper channels and a plurality of lower channels, said inlet means for the second space including upper openings leading to said upper channels and lower openings leading to said lower channels, said upper openings for each upper channel having a larger area than said lower openings for each lower channel.

3. The solar collector of claim 1 wherein the total area of said inlet means to the first and second spaces is less than the total area of said inlet means to the primary conduit means.

4. The solar collector of claim 1 having a corrugated member in said second space and provided with peaks which underlie and support the primary conduit means.

5. The solar collector of claim 1 wherein said primary conduit means is formed to a pair of adjacent sheets having mutually contacting longitudinally extending areas and mutually spaced longitudinally extending areas.

6. The solar collector of claim 1 wherein the walls of the enclosure have spaced-apart laterally-projecting external-spacers for reducing heat transfer from the walls to an adjacent structure.

7. The solar collector of claim 1 having side conduit means extending alongside the chamber between said chamber and a said wall, said conduits having inlet and outlet means enabling a heat exchange medium to flow therethrough to reduce heat losses from the chamber through the walls.

8. The solar collector of claim 7 wherein the outlet means of the side conduit includes an opening leading to said first space.

9. A solar collector for heating air or other gaseous heat exchange media, comprising, an enclosure having a chamber formed by walls and a cover which is transparent to radiant solar energy, primary conduit means located within the enclosure for providing a primary flow passage for a heat exchange medium, said primary conduit means having an upper surface which is absorptive of solar radiation, said primary conduit being spaced from the cover to provide a first space between the primary conduit means and the cover, said primary conduit means being spaced from the bottom of the chamber to provide a second space between the primary conduit means and the bottom of the chamber, said primary conduit means having inlet and outlet means enabling a heat exchange medium to flow therethrough to remove heat from the chamber, said first space having inlet and outlet means enabling heat exchange medium to flow therethrough to remove heat from the chamber and reduce heat losses through said cover, said second space means having inlet and outlet means enabling a heat exchange medium to flow therethrough to remove heat from the chamber and reduce heat transmission to the bottom of the enclosure, said primary conduit means being formed of a pair of adjacent sheets having mutually contacting longitudinally extending areas and mutually spaced longitudinally extending areas, and a corrugated member in said second space and provided with peaks which underlie and support the primary conduit means.

10. The solar collector of claim 9 having a common inlet chamber which contains a gaseous heat exchange heat medium and is in communication with all of said inlet means, said inlet means of said primary conduit being substantially larger than the inlet means of said first and second spaces to provide a substantially greater quantitative flow of the gaseous heat exchange medium through said primary conduit means than through said spaces.

11. The solar collector of claim 10 wherein the total area of said inlet means to the first and second spaces is less than the total area of said inlet means to the primary conduit means.

12. The solar collector of claim 9 having side conduit means extending alongside the chamber between said chamber and a said wall, said side conduit means having inlet and outlet means enabling a heat exchange medium to flow therethrough to reduce heat losses from the chamber through the walls.

13. The solar collector of claim 12 wherein the outlet means of the side conduit includes an opening leading to said first space.

* * * * *